US006898600B2

(12) United States Patent
Fruchtman et al.

(10) Patent No.: US 6,898,600 B2
(45) Date of Patent: May 24, 2005

(54) METHOD, SYSTEM, AND PROGRAM FOR MANAGING DATABASE OPERATIONS

(75) Inventors: Barry Fruchtman, Tucson, AZ (US); William John Scheid, III, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 352 days.

(21) Appl. No.: 10/150,209

(22) Filed: May 16, 2002

(65) Prior Publication Data

US 2003/0217068 A1 Nov. 20, 2003

(51) Int. Cl.[7] ................... G06F 17/30; G06F 13/326
(52) U.S. Cl. ................... 707/10; 710/240; 718/104; 718/107
(58) Field of Search .............. 707/10; 710/240–244; 718/104–107

(56) References Cited

U.S. PATENT DOCUMENTS

| | | | |
|---|---|---|---|
| 5,388,254 A | * 2/1995 | Betz et al. | 714/16 |
| 5,524,241 A | * 6/1996 | Ghoneimy et al. | 707/10 |
| 5,764,977 A | * 6/1998 | Oulid-Aissa et al. | 707/10 |
| 5,835,766 A | 11/1998 | Iba et al. | |
| 5,845,117 A | 12/1998 | Fujita | |
| 5,909,542 A | * 6/1999 | Paquette et al. | 709/203 |
| 6,009,275 A | 12/1999 | DeKoning et al. | |
| 6,728,809 B1 | * 4/2004 | Suzuki et al. | 710/118 |

OTHER PUBLICATIONS

Two Phase Resource Queries with a Suppressible Second Phase IBM Technical Disclosure Bulletin, Dec. 1991, vol. 34, No. 7B, pp. 357–395.*
U.S. Appl. No. 10/091,797, filed Mar. 6, 2002, entitled "Multi–Session No Query Restore", by inventors R. Edwards, et al.
D. Hewgill, et al., "Tivoli Storage Manager Version 4.2 Technical Guide", IBM, Document No. SG24–6277–00, Jan. 2002, Chapter 1, pp. 37–54, Chapter 4, pp. 119–130.

* cited by examiner

Primary Examiner—Jack Choules
(74) Attorney, Agent, or Firm—David W. Victor; Konrad Raynes & Victor, LLP

(57) ABSTRACT

Provided are a method, system, and program for performing database operations. A request is received to access database resources from a client over a network. An entry is added to a monitor list indicating a last access time to the database by the client, wherein the entry is associated with an access of database resources in response to the received request. The monitor list is scanned to determine an entry where a difference of a current time and last access time exceeds a timeout threshold. A calling a function is indicated in the entry. The function causes an abort operation to be performed to terminate the access of database resources associated with the determined entry.

42 Claims, 4 Drawing Sheets

METHOD, SYSTEM, AND PROGRAM FOR MANAGING DATABASE OPERATIONS

BACKGROUND OF THE INVENTION

1. Field of the Invention

The present invention relates to a system, method, and program for managing database operations.

2. Description of the Related Art

A backup program, such as the International Business Machines Corporation (IBM) Tivoli Storage Management backup program,** maintains an image of the data and programs on systems in a network on a backup storage, such as on tape cartridges. In the event of a system failure or other event that results in a loss of data on the network systems, the backup program may be used to restore the data and programs from the tape cartridges.

**Tivoli is a registered trademark of IBM.

In certain prior art backup systems, a backup client on a client computer will backup data on a local backup storage or over a high speed data transmission network, such as a Storage Area Network (SAN) using Fibre Channel technology through a storage agent component, such as the Tivoli Storage Manager storage agent. The storage agent would further insert metadata concerning the data being backed up into the backup repository in a backup database on a server computer. The transmission to the backup server of the backup metadata may occur over a network different than the network used to transmit the backup data, such as a Local Area Network (LAN). This type of backup, where the backup metadata is sent over one network and the backup data is sent over another, is referred to as a LAN free backup, because the LAN transmission of metadata is "free" of the actual backup data. The backup data is sent over a high speed data network, such as a SAN. In this way, the backup database at the backup server may maintain information on data backed up on different SANs or devices.

In such backup systems, the storage agent, in response to backup requests from a backup client running on a client system, will access the backup database on the server to directly manipulate records and update the backup database with backup metadata on backup operations the client has performed.

In systems where a storage agent or client directly accesses a database on a server to modify metadata records, concurrently conflicting requests at the server and storage agent and a failure at the agent to release the lock on the database resources can prevent other processes or clients from accessing such resources.

Accordingly, there is a need in the art for improved techniques for managing database resources accessed by a system or processes.

SUMMARY OF THE PREFERRED EMBODIMENTS

Provided are a method, system, and program for performing database operations. A request is received to access database resources from a client over a network. An entry is added to a monitor list indicating a last access time to the database by the client, wherein the entry is associated with an access of database resources in response to the received request. The monitor list is scanned to determine an entry where a difference of a current time and last access time exceeds a timeout threshold. A calling a function is indicated in the entry. The function causes an abort operation to be performed to terminate the access of database resources associated with the determined entry.

In further implementations, the access of database resources comprises accessing a lock to at least one database resource. Releasing the database resources associated with the determined entry comprises releasing the lock to enable another client to access the lock.

Still further, the access of database resources may comprise initiating a transaction with respect to the database, and wherein releasing the database resources comprises terminating the transaction to return the accessed database resources to a pre-transaction state.

Yet further, entries in the list may be associated with database access requests from multiple clients over the network.

In certain implementations, the client accesses database resources by executing transactions against the database directly over the network.

Described implementations provide techniques for monitoring client access to database resources in a monitor list. Those accesses of database resources that exceed a timeout period are aborted in order to release the accessed database resources for other client access requests.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
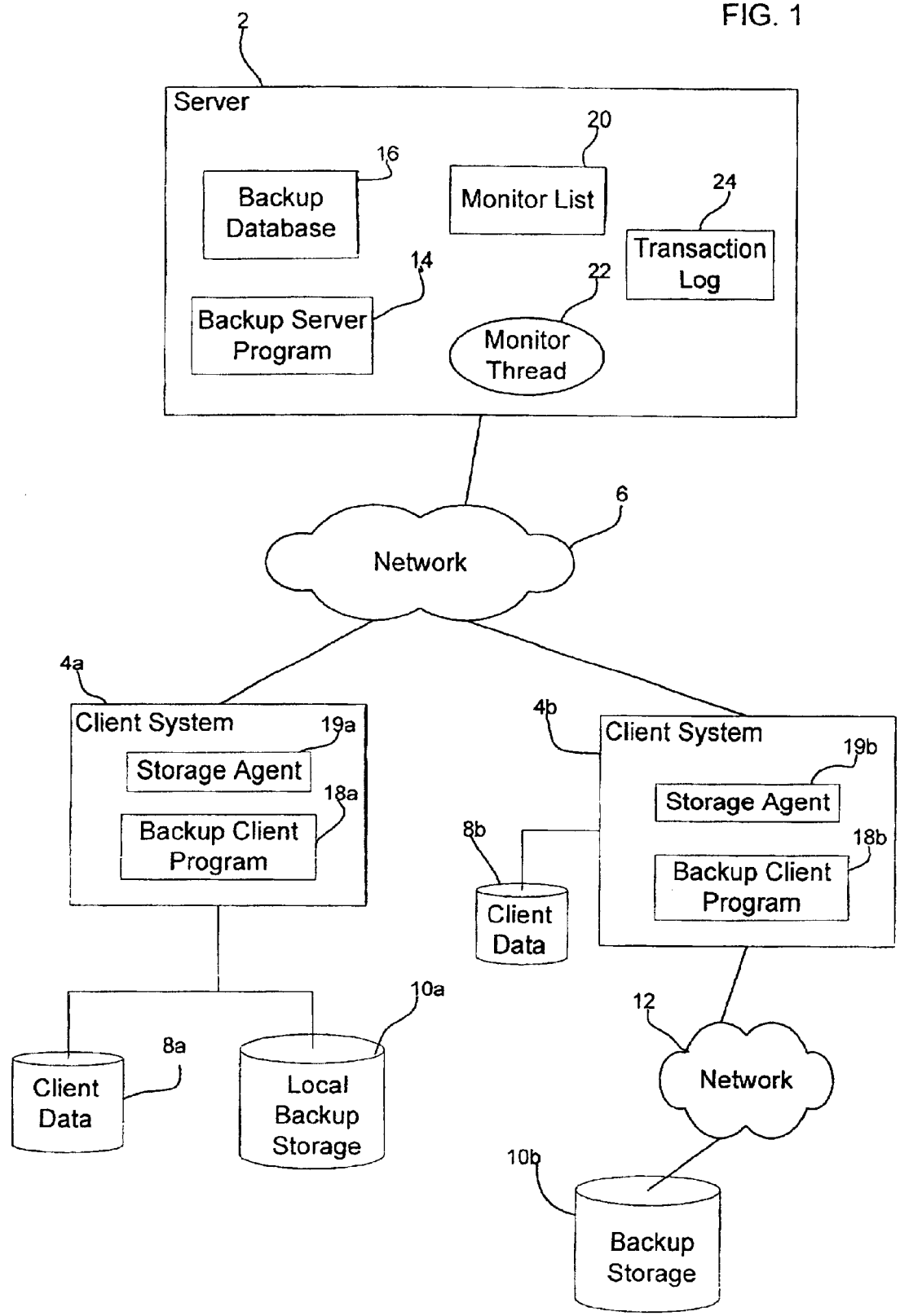
FIG. 1 illustrates a computing environment in which aspects of the invention are implemented.

FIG. 1 illustrates a computing environment in which aspects of the invention may be implemented. A server 2 is in communication with multiple client computers 4a, 4b over a network 6. The client system 4a may backup client data 8a to a local backup storage 10a. The client 4b may backup client data 8b in backup storage 10b over a network 12. The backup storages 10a, 10b may comprise any non-volatile storage system known in the art, such as a one or more hard disk drives, a Direct Access Storage Device (DASD), Just a Bunch of Disks (JBOD), a Redundant Array of Independent Disks (RAID), tape library, optical library, etc. The server 2 includes a backup server program 14 that maintains a backup database 16 that includes records on files the clients system 4a, 4b have archived in backup storage 10a, 10b. The networks 6 and 12 may comprise any network known in the art, such as a an Intranet, the Internet Storage Area Network (SAN), Local Area Network (LAN), Wide Area Network (WAN), etc., using any network protocol known in the art. In certain implementations, the networks 6 and 12 comprise different networks. For instance, the network 6 may comprise a TCP/IP based network, such as a LAN, Wide Area Network (WAN), intranet, etc., and the network 12 may comprise a high speed storage network, such as a SAN utilizing Fibre Channel technology. Still further, the networks 6 and 12 may be part of the same network.

Backup client programs 18a, 18b execute on the clients system 4a, 4b and communicate backup information to the backup server program 14. In certain implementations, the backup client program 18a, 18b would backup client data 8a, 8b in backup storage 10a, 10b and only transmit metadata on the backup operations to the backup server program 14 to include in the backup database 16. In alternative implementations, the backup client programs 18a, 18b may transmit backup objects as well as metadata to the backup server program 14 so that the backup server program 14 would add the backup objects to a backup storage (not shown). Although two client systems 4a, 4b are shown, there may be only one or more than two client systems 4a, 4b with backup client programs 18a, 18b on the network 6.

In certain implementations, the client systems 4a, 4b include storage agent programs 19a, 19b that enable the backup client programs 18a, 18b to transmit backup data and objects to the backup server program 14. The storage agents 19a, 19b function as a local service at the client systems 4a, 4b to manage communication and operations with the backup server program 14. The backup client programs 18a, 18b may view the storage agent 19a, 19b with which they communicate as the server 2. Although the storage agents 19a, 19b are shown as resident on the client systems 4a, 4b, in alternative implementations, the storage agents 19a, 19b may run on a system external to the client systems 4a, 4b. One storage agent 19a, 19b may manage access to the server 2 for a single client (as shown in FIG. 1) or for multiple clients.

The backup system and storage agents may be implemented with the IBM Tivoli storage system, described in the publication entitled "Tivoli Storage Manager, Version 4.2", published by International Business Machines, Corporation (IBM), IBM document no. SG24-6277-00 (January, 2002), which publication is incorporated herein by reference in its entirety. However, those skilled in the art will appreciate that the backup implementations described herein may be implemented with any backup technology in a client/server environment. For instance, the storage agents 19a, 19b may comprise any database client capable of communicating with a database server to backup data.

The backup client programs 18a, 18b, through the corresponding storage agents 19a, 19b, may add or modify records into the backup database 16, which provides searchable and indexable information on backed-up objects. The backup database 16 may be implemented with any backup architecture known in the art, such as a relational database, object oriented database, a table, etc. In certain implementations, the storage agents 19a, 19b perform operations on the backup database 16 directly by adding, modifying, deleting, etc. records without intervention by the backup server program 14. The backup database 16 maintains a record for each backup object that is written to backup storage 10a, 10b by the backup client programs 18a, 18b. Each record may include information uniquely identifying the backup object, the file path location (e.g., drive name, path name, high level path name, etc.) and name of the backup object, backup attributes such as administrator defined backup policies (e.g., attributes that control the generation, destination, and expiration of backup files), an associated backup group, etc.

The backup server program 14 maintains a monitor list 20 providing information on all processes that are accessing database 16 resources, including those initiated by the storage agents 19a, 19b. The backup server program 14 and/or storage agent 19a, 19b run a monitor thread 22 to review the monitor list 20 and abort any idle processes accessing database resources 16 in the manner described below. The monitor thread 22 would further communicate with the backup server program 14 and/or storage agents 19a, 19b to coordinate abort operations. The backup server program 14 further maintains a transaction log 24 that indicates all changes that have been made to the backup database 16. The backup server program 14 may use the log 24 to reverse changes made before they are committed in order to restore the backup database 16 to a previous state.

Figure 2:
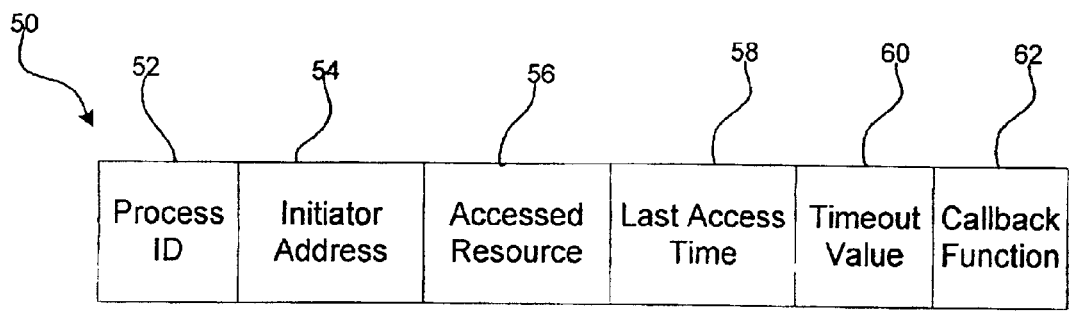
FIG. 2 illustrates a metadata record on backed up data in accordance with implementations of the invention.

FIG. 2 illustrates the fields that may be included in each entry 50 in the monitor list 20. A process identifier (ID) 52 uniquely identifies a process accessing a resource in the database 16. An initiator address 54 provides a network address of the storage agent 19a, 19b that initiated the database process, such as a TCP/IP address, a name that can be resolved as an address, etc. If the process accessing the resources is local, such as on the server 4, then the initiator address 54 would indicate such local location of the initiator. The accessed resource 56 indicates the database resources that the storage agent 19a, 19b has accessed, such as database locks, database pages, tablespaces, open records for a transaction, etc. In certain implementations, there may be one entry 50 for each resource the storage agent 19a, 19b accesses, such as one entry for each lock or transaction, where a transaction may perform operations with respect to one or more operations. Alternatively, there may be one entry for each client, such that the accessed resources 56 field indicates multiple accessed resources, e.g., locks, pages, etc. A last access time 58 indicates a time that a storage agent 19a, 19b or other process was last granted access to the database 16 resource(s) indicated in the accessed resources 56 field. The monitor list 20 may maintain entries 50 from multiple storage agents 19a, 19b in different client systems 4a, 4b or multiple database operations initiated by different storage agents, or other processes. A timeout value 60 indicates an interval that must pass before a timeout will occur. This timeout value 60 may be adjustable. A callback function 62 is a program for the monitor thread 22 to call to cause the abort operation to be performed. The callback function may initiate an abort operation that runs on the client systems 4a, 4b and/or the server 2. The abort operation initiated by the callback function would handle the timeout error and perform any operations needed to release the resources and terminate the database operation. In this way, the monitor thread 22 returns the callback or program indicated in field 62 to the process that initiated the operation to be monitored. The callback function would be provided by the storage agent 19a, 19b and/or database client that initiated the process on the database resources.

Figure 3:
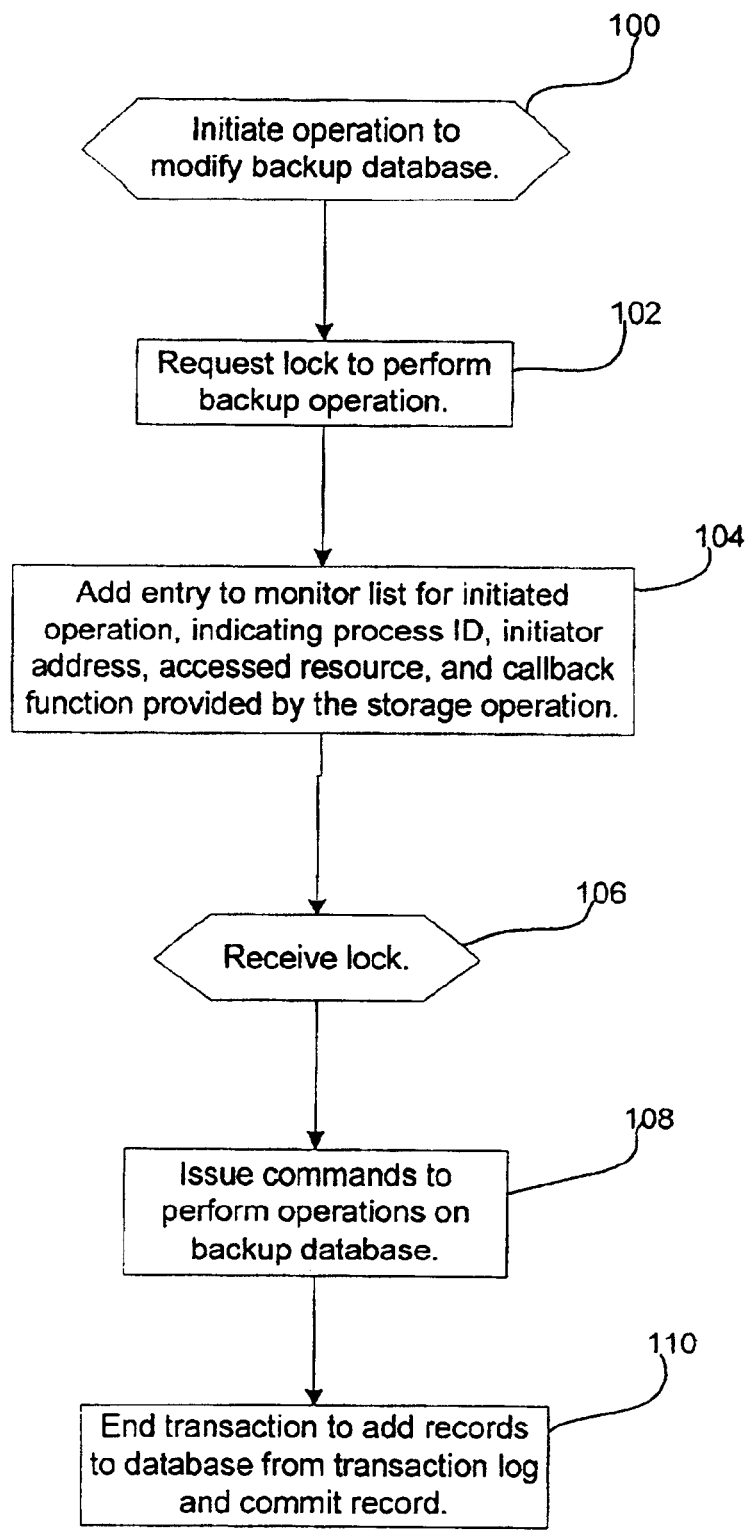
FIG. 3 illustrates logic implemented in a backup client to provide backup metadata to the backup database.

FIG. 3 illustrates logic implemented by the storage agent 19a, 19b to update the backup database 16 with records for new backup objects added to backup storage 10a, 10b. At block 100, the storage agent 19a, 19b initiates a transaction to modify the backup database 16 over the network 6 in response to a backup request or other backup related operation initiated by the storage agent 19a, 19b or other process. The storage agent 19a, 19b would request (at block 102) a lock for the backup database 16 resources subject to the requested transaction. Different levels of locks may be obtained depending on the database resources being accessed. The storage agent 19a, 19b or backup server program 14 may then add (at block 104) an entry 50 (FIG.

2) to the monitor list 20 for the initiated database operation, and include information in the entry 50, including the process ID field 52, the address of the initiator 54, the accessed resource 56, and a callback function 62 provided by the initiator that is used to invoke the abort operation if the database resource has not been accessed for a period equivalent to the indicated timeout value 60.

Upon receiving the lock (at block 106), the storage agent 19a, 19b may then issue (at block 108) database transactions to add or modify records in the backup database 16 providing metadata on backup operations in backup storages 8a, 8b. After performing transactions, the storage agent 19a, 19b would then initiate (at block 110) a commit operation to insert any modified records into the backup database 16 and finalize the transaction. For instance, in certain implementations, any modifications submitted by the storage agent 19a, 19b are added to the transaction log 24. Upon committing the transaction, the logged data is added to the backup database 16 to initialize the transaction.

Figure 4:
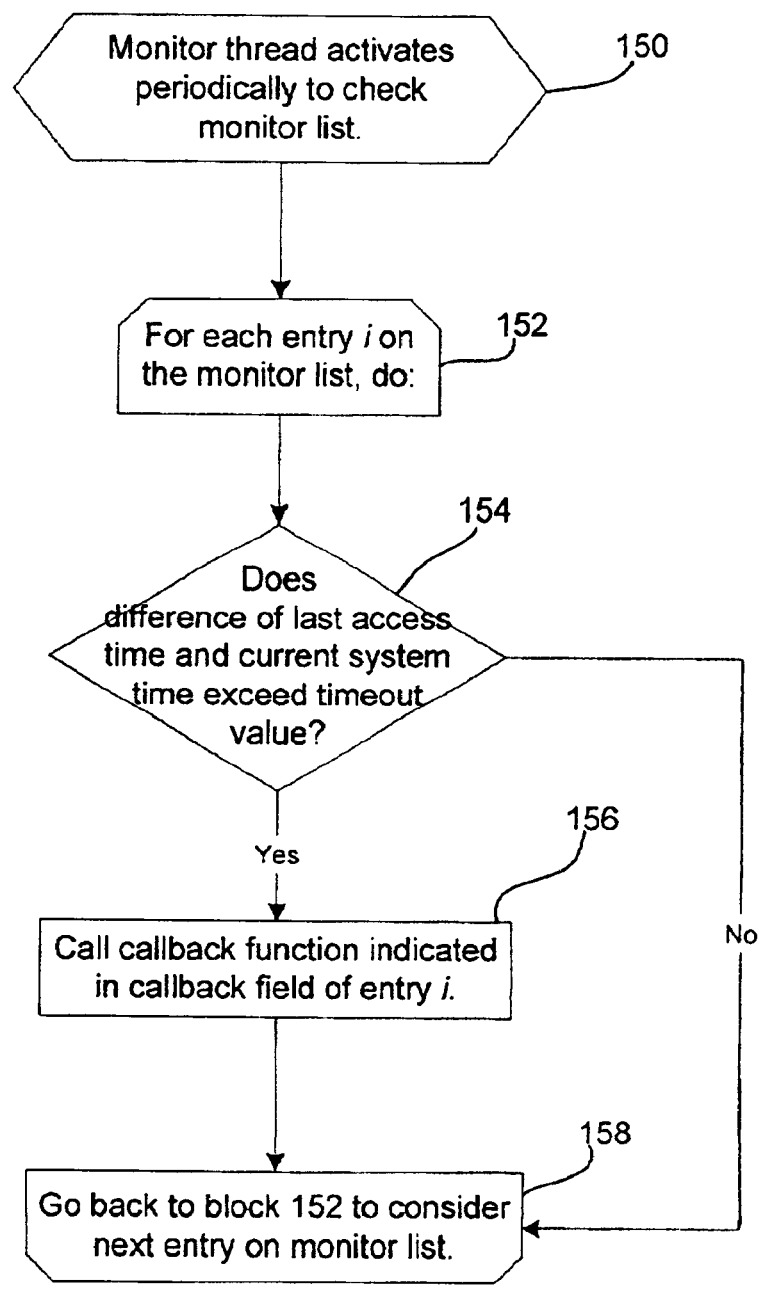
FIG. 4 illustrates logic to monitor database transactions in accordance with implementations of the invention.

FIG. 4 illustrates logic implemented in the monitor thread 22 to perform monitoring operations in accordance with implementations of the invention. At block 150, the storage agent 19a, 19b invokes the monitor thread 22 periodically to monitor processes accessing database resources. For each entry i on the monitor list 20, the monitor thread 22 performs the operations between 152 through 166. If (at block 154) the difference of the last access time indicated in the last access time field 58 in the entry i and the current system time exceeds the adjustable timeout value 60 (FIG. 2), then the monitor thread 22 calls (at block 156) the program or callback function indicated in field 62 to initiate an abort operation with respect to the storage agent 19a, 19b; otherwise, control proceeds to block 158 to consider the next entry on the list. This callback function may be performed on the server 2 or on the client system 4a, 4b. In certain implementations, different timeout values may be provided for different resources being accessed as indicated in the accessed resources field 56. For instance, the timeout value for a lock may be different than the timeout for a transaction. Further, the times may be configured and set by an administrator. The abort function initiated by the callback function may perform any operations related to the operation being monitored. For instance, if the operation being monitored accessed locks to database resources, then the abort function may release the locks or fail the lock request, and perform any other necessary abort related operations, such as rolling back any database. After calling the callback function 62, control proceeds (at block 158) back to block 152 to process the next entry in the monitor list 22, if there are further entries. The storage agent 19a, 19b would abort the transaction in response to the abort issued at block 156 and roll-back any database modifications. In certain implementations, where database modifications are logged, the storage agent 19a, 19b would remove any database modifications from the transaction log 24 so that the modifications are not applied to the backup database 16.

Further, in certain implementations, if as part of a transaction, the backup server program 14 or storage agent 19a, 19b receives updates to a resource, then the backup server program 14 may update the last access time 58 to the current time to indicate that the backup client program 18a, 18b has not aborted and is still active. In this way, the timeout period is restarted when the agent or backup client program is active and performing operations with respect tot he accessed resources.

With the described implementations, the monitor thread 20 may prevent a storage agent 19a, 19b or other process that has become idle as a result of a processing failure or network disconnect from precluding another process on another system or the same system from accessing the database resource. As discussed, the described implementations may apply in situations where the storage agent or database client directly accesses records in the database over a network. The described monitor process provides a technique for monitoring client processes accessing the database to prevent one client from timing out and preventing other processes from accessing the resource.

Additional Implementation Details

The above described implementations for monitoring a database may be implemented using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.)). Code in the computer readable medium is accessed and executed by a processor. The code in which preferred embodiments of the configuration discovery tool are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the implementation of FIG. 1, the backup client and storage agent and backup server programs are on separate machines. Alternatively, the backup client and server programs, storage agent, application server, and database can be implemented on the same machine, or distributed across any number of machines.

In the described implementations, the database comprised a backup database accessed by storage agents over a network. The described implementations may also apply to non-database environments. For instance, the database may comprise any type of database used by any type of client application that accesses and manipulate the database directly over a network without having the transactions executed by a database server.

In the described implementations, the monitor list 20 included information on processes initiated by the storage agent 19a, 19b. Further, the monitor list 20 may include entries for processes accessing database resources originating from locations other than a storage agent. For instance, processes accessing the database resources may originate from the server 2, some other system, or from some remote procedure call. This allows recovery from an inactive process regardless of its origins. Further, the initiator address 54 (FIG. 2) may indicate the address or port of any process initiating the database access operation.

In the described implementations, the backup client program 18a, 18b accesses the backup database 16 through the storage agent 19a, 19b. In alternative implementations, the storage agent 19a, 19b may comprise any database client used to interface with a database server in a database client/server environment. In still further implementations, the functionality of the storage agent may be implemented in the backup client programs.

In the described implementations, the storage agents directly executed operations against the database without going through a database server. In alternative implementations, the storage agents or database clients may submit database transactions, such as Structured Query Language (SQL) operations to a database server, where the database server would initiate the monitor thread to monitor database transactions being executed by the database server.

The logic of FIGS. 3 and 4 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel, or operations described as performed by a single process may be performed by distributed processes.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed:

1. A method for performing database operations, comprising:
   receiving a request to access database resources from a client over a network;
   adding an entry to a monitor list indicating a last access time to the database by the client, wherein the entry is associated with an access of database resources in response to the received request;
   scanning the monitor list to determine an entry where a difference of a current time and the last access time exceeds a timeout threshold; and
   calling a function indicated in the entry, wherein the function causes an abort operation to be performed to terminate the access of database resources associated with the determined entry.

2. The method of claim 1, wherein the called function invokes the abort operation on a server including the database resources, and wherein the abort operation releases the database resources associated with the determined entry.

3. The method of claim 1, wherein the called function invokes the abort operation on the client, and wherein the abort operation releases the database resources associated with the determined entry.

4. The method of claim 1, wherein the client access of database resources comprises:
   modifying records in the database.

5. The method of claim 1, wherein the access of database resources includes accessing a lock to at least one database resource, and the abort operation releases a lock to enable another client to access the database resources.

6. The method of claim 1, wherein the access of database resources comprises initiating a transaction with respect to the database, and wherein releasing the database resources comprises terminating the transaction to return the accessed database resources to a pre-transaction state.

7. The method of claim 6, wherein the transaction comprises the client modifying at least one record in the database.

8. The method of claim 1, wherein the entries in the list are associated with database access requests from multiple clients over the network.

9. The method of claim 1, wherein different timeout periods are used for accesses of different database resources.

10. The method of claim 1, further comprising:
    receiving indication that the client performed an operation with respect to the database resource associated with one entry; and
    updating the last access time for that entry to indicate the last operation performed by the client with respect to the database resource.

11. The method of claim 1, wherein the database comprises a backup database indicating backup objects backed-up by the client, and wherein the client comprises a storage agent performing backup operations transmitted from a backup client program.

12. The method of claim 11, wherein the client backs up the object in a backup storage and wherein accessing the backup database comprises adding a record to the database providing information on the object backed up.

13. The method of claim 1, wherein the client accesses database resources by executing transactions against the database directly over the network.

14. The method of claim 1, wherein the client accesses database resources by submitting transactions to a database server to execute the transactions against the database.

15. A system for performing database operations, wherein a client communicates database access requests over a network, comprising:
    a computer readable medium including database resources;
    means for receiving a request to access database resources from the client over the network;
    means for adding an entry to a monitor list in the computer readable medium indicating a last access time to the database by the client, wherein the entry is associated with an access of database resources in response to the received request;
    means for scanning the monitor list to determine an entry where a difference of a current time and last access time exceeds a timeout threshold; and
    means for calling a function indicated in the entry, wherein the function causes an abort operation to be performed to terminate the access of database resources associated with the determined entry.

16. The system of claim 15, further comprising:
    a server including the computer readable medium having the database resources and the monitor list, wherein the server and the client communicate over the network, wherein the called function invokes the abort operation on the server, and wherein the abort operation releases the database resources associated with the determined entry.

17. The system of claim 15, wherein the called function invokes the abort operation on the client, and wherein the abort operation releases the database resources associated with the determined entry.

18. The system of claim 15, wherein the client access of database resources comprises:
   modifying records in the database.

19. The system of claim 15, wherein the access of database resources includes accessing a lock to at least one database resource, and wherein the abort operation includes releasing the lock to enable another client to access the database resources.

20. The system of claim 15, wherein the access of database resources comprises initiating a transaction with respect to the database, and wherein releasing the database resources comprises terminating the transaction to return the accessed database resources to a pre-transaction state.

21. The system of claim 20, wherein the transaction comprises the client modifying at least one record in the database.

22. The system of claim 15, wherein the entries in the list are associated with database access requests from multiple clients over the network.

23. The system of claim 15, wherein different timeout periods are used for accesses of different database resources.

24. The system of claim 15, further comprising:
   means for receiving indication that the client performed an operation with respect to the database resource associated with one entry; and
   means for updating the last access time for that entry to indicate the last operation performed by the client with respect to the database resource.

25. The system of claim 15, wherein the database comprises a backup database indicating backup objects backed-up by the client, and wherein the client comprises a storage agent performing backup operations transmitted from a backup client program.

26. The system of claim 25, wherein the client backs up the object in a backup storage and wherein accessing the backup database comprises adding a record to the database providing information on the object backed up.

27. The system of claim 15, wherein the client accesses database resources by executing transactions against the database directly over the network.

28. The system of claim 15, wherein the client accesses database resources by submitting transactions to a database server to execute the transactions against the database.

29. An article of manufacture for performing database operations, wherein a client communicates database access requests over a network, and wherein the article of manufacture causes operations to be performed, the operations comprising:
   receiving a request to access database resources from the client over the network;
   adding an entry to a monitor list indicating a last access time to the database by the client, wherein the entry is associated with an access of database resources in response to the received request;
   scanning the monitor list to determine an entry where a difference of a current time and last access time exceeds a timeout threshold; and
   calling a function indicated in the entry, wherein the function causes an abort operation to be performed to terminate the access of database resources associated with the determined entry.

30. The article of manufacture of claim 29, wherein the called function invokes the abort operation on a server including the database resources, and wherein the abort operation releases the database resources associated with the determined entry.

31. The article of manufacture of claim 29, wherein the called function invokes the abort operation on the client, and wherein the abort operation releases the database resources associated with the determined entry.

32. The article of manufacture of claim 29, wherein the client access of database resources comprises:
   modifying records in the database.

33. The article of manufacture of claim 29, wherein the access of database resources includes accessing a lock to at least one database resource, and the abort operation releases a lock to enable another client to access the database resources.

34. The article of manufacture of claim 29, wherein the access of database resources comprises initiating a transaction with respect to the database, and wherein releasing the database resources comprises terminating the transaction to return the accessed database resources to a pre-transaction state.

35. The article of manufacture of claim 34, wherein the transaction comprises the client modifying at least one record in the database.

36. The article of manufacture of claim 29, wherein the entries in the list are associated with database access requests from multiple clients over the network.

37. The article of manufacture of claim 29, wherein different timeout periods are used for accesses of different database resources.

38. The article of manufacture of claim 29, further comprising:
   receiving indication that the client performed an operation with respect to the database resource associated with one entry; and
   updating the last access time for that entry to indicate the last operation performed by the client with respect to the database resource.

39. The article of manufacture of claim 29, wherein the database comprises a backup database indicating backup objects backed-up by the client, and wherein the client comprises a storage agent performing backup operations transmitted from a backup client program.

40. The article of manufacture of claim 39, wherein the client backs up the object in a backup storage and wherein accessing the backup database comprises adding a record to the database providing information on the object backed up.

41. The article of manufacture of claim 29, wherein the client accesses database resources by executing transactions against the database directly over the network.

42. The article of manufacture of claim 29, wherein the client accesses database resources by submitting transactions to a database server to execute the transactions against the database.

* * * * *

UNITED STATES PATENT AND TRADEMARK OFFICE
CERTIFICATE OF CORRECTION

PATENT NO.        : 6,898,600 B2
APPLICATION NO. : 10/150209
DATED             : May 24, 2005
INVENTOR(S)       : Barry Fruchtman and William John Scheid, III Page 1 of 1

It is certified that error appears in the above-identified patent and that said Letters Patent is hereby corrected as shown below:

<u>Column 8</u>, line 53, delete "and last" and insert -- and the last -- .

<u>Column 9</u>, line 60, delete "and last" and insert -- and the last -- .

Signed and Sealed this

Thirtieth Day of January, 2007

JON W. DUDAS
*Director of the United States Patent and Trademark Office*